(12) United States Patent
Báder et al.

(10) Patent No.: US 9,258,235 B2
(45) Date of Patent: *Feb. 9, 2016

(54) EDGE NODE FOR A NETWORK DOMAIN

(71) Applicant: TELEFONAKTIEBOLAGET L M ERICSSON (PUBL), Stockholm (SE)

(72) Inventors: Attila Báder, Paty (HU); Attila Takács, Budapest (HU); András Császár, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 70 days.

This patent is subject to a terminal disclaimer.

(21) Appl. No.: 13/964,220

(22) Filed: Aug. 12, 2013

(65) Prior Publication Data
US 2013/0322256 A1 Dec. 5, 2013

Related U.S. Application Data

(63) Continuation of application No. 12/514,046, filed as application No. PCT/EP2006/010820 on Nov. 10, 2006, now Pat. No. 8,509,085.

(51) Int. Cl.
H04L 5/12 (2006.01)
H04L 12/801 (2013.01)
H04W 36/00 (2009.01)
H04L 12/825 (2013.01)
H04L 12/833 (2013.01)

(52) U.S. Cl.
CPC ............... *H04L 47/12* (2013.01); *H04L 47/10* (2013.01); *H04L 47/11* (2013.01); *H04L 47/26* (2013.01); *H04L 47/31* (2013.01); *H04W 36/00* (2013.01)

(58) Field of Classification Search
CPC .......................... H04L 12/801; H04W 36/00
USPC ................ 370/236–237, 468–469, 231–232, 370/395.2–395.72
See application file for complete search history.

(56) References Cited

U.S. PATENT DOCUMENTS

| 2002/0097726 | A1 | 7/2002 | Garcia-Luna-Aceves et al. |
| 2004/0008628 | A1* | 1/2004 | Banerjee ............... 370/236.1 |
| 2004/0042398 | A1* | 3/2004 | Peleg et al. ............... 370/230 |
| 2005/0047340 | A1 | 3/2005 | Babiarz et al. |

FOREIGN PATENT DOCUMENTS

WO WO2006052174 A1 5/2006

* cited by examiner

*Primary Examiner* — Iqbal Zaidi

(57) ABSTRACT

A system for managing congestion within a network domain includes an ingress node, an interior node, and an egress node. The ingress node receives and routes data units entering the network domain. The interior node detects whether a load exceeds one or more load thresholds and generates congestion marked data units. The egress node detects the presence of congestion marked data units and reacts to the detection of the presence of congestion marked data units by invoking a congestion control process.

48 Claims, 8 Drawing Sheets

EDGE NODE FOR A NETWORK DOMAIN

CLAIMING BENEFIT OF PRIOR FILED U.S. APPLICATION

This application is a continuation of International Application PCT/EP2006/010820, with an international filing date of Nov. 10, 2006, which corresponds to the national-stage entry U.S. patent application Ser. No. 12/514,046 filed on Oct. 5, 2009, the contents of which are hereby incorporated by reference herein.

FIELD OF THE INVENTION

The present application relates to an edge node for a network domain that comprises one or more ingress node(s), a plurality of interior routers and one or more egress node(s), to an interior router of such a network domain, and to corresponding control methods for an edge node and an interior router.

BACKGROUND OF THE INVENTION

In the field of communications packet-switched transport is widely used. Recently, IP-based transport solutions have received more attention. IP stands for Internet Protocol. The interest in IP is at least partially due to the flexibility and wide deployment of IP technologies. However, communication networks, such as telephone networks, have different characteristics when compared to traditional IP networks, because communication networks typically desire to be simple, inexpensive and to be able to provide a defined Quality of Service (QoS). Due to Quality of Service requirements, traffic congestion control is important in communication networks.

One of the concepts for providing QoS in IP networks is resource reservation in routers by signalling along the data path. As an example, the Internet Engineering Task Force (IETF) standardization organisation has specified a signalling protocol called RSVP (Resource ReSerVation Protocol) for making resource reservations in IP routers and for providing integrated services for real-time and nonreal-time traffic in the Internet (see e.g. R. Braden at al.: Resource Reservation Protocol (RSVP)—version 1 "Functional Specification", RFC2205, September 1997; R. Braden at al.: "Integrated Services in the Internet Architecture: an Overview", RFC1633, 1994; J. Roclawski: "The Use of RSVP with IETF Integrated Services", RFC2210, September 1997). In this technology, RSVP signalling messages reserve resources in each router along the data path before sending a real-time traffic flow. Real-time flows are admitted into the network if resources are successfully reserved in each router along the data path.

This method requires storing per-flow reservation states in each router along the data path. The reservation states are soft states, which means that they have to be refreshed by sending periodic refresh messages. If a reserved state is not refreshed, the state and corresponding resources are removed after a time-out period. Reservations can also be removed by explicit tear-down messages. With the help of per-flow states, RSVP messages always follow the data path up- and downstream. Therefore, it is able to inter-work with standard routing protocols. If the traffic is re-routed, e.g. due to overload of a router, refresh messages make reservations in the new data path. Storing per-flow states in each router also enables the possibility of local path repair. After re-routing, if there are not enough resources to support all flows desired for the new path, some flows can be terminated.

Storing and maintaining per-flow states in each router can be a problem in large networks, where the number of flows and therefore the number of reservation states can be high. In response to this scalability problem of RSVP, the IETF specified an RSVP aggregation method that allows making reservations for aggregated flows (see RFC3175, September 2001). Aggregated reservation states are not necessarily created, modified or refreshed for each flow request.

The RSVP method of aggregation is capable of making an admission control decision only at an aggregated level, which means that all flows that are treated together as an aggregate are terminated if there are not enough resources on a new path after re-routing.

As means for providing QoS in large-scale networks, an architecture referred to as Differentiated Services (DiffServ) was proposed, see RFC2475, 1998. In the DiffServ architecture scalability is achieved by offering services on an aggregate rather than per-flow basis, and by arranging the system such that as much as possible of the per-flow state information is kept at edge nodes of the network, and only aggregated state information is kept in the interior nodes. The service differentiation is achieved by using a specific field in the IP header, the so-called Differentiated Services (DS) field. Packets are classified into Per-Hop Behaviour (PHB) groups at the DiffServ edge nodes. Packets are handled in DiffServ routers according to the PHB indicated in the DS field of the message header. The DiffServ architecture does not specify any way for devices outside of the domain to dynamically reserve resources or receive indications of network resource availability. In practise, service providers rely on subscription-time Service Level Agreements (SLAs) that statically define the parameters of the traffic that will be accepted from a customer.

DiffServ networks provide QoS for real-time traffic in a scalable way. DiffServ is a static architecture in which traffic is limited at the domain edges, and interior nodes have to be designed with proper dimensioning. There are no dynamic mechanisms for dealing with overload due to re-routing within the domain, such that interior nodes and links need to be over-dimensioned with respect to average load, in order to provide a QoS guarantee up to at least a certain level.

The IETF Next Steps In Signalling (NSIS) working group is working on a protocol to cope with new signalling requirements in IP networks, see RFC3726, April 2004. The QoS signalling application protocol of NSIS is similar to RSVP, but it has some additional features, such as supporting different QoS models. One of the QoS models is Resource Management in DiffServ (RMD). RMD defines scalable admission control methods for DiffServ networks. It also includes a congestion control function that is able to terminate a number of flows in a congestion situation, in order to maintain a required QoS for the rest of the flows.

An important characteristic of IP networks and some other packet switched networks compared with other technologies used in communications, such as ATM or SDH, is that IP routing protocols automatically adapt to topology changes for example, if a link or node fails, traffic is automatically re-routed. However, a problem can occur in that the new path may not be able to support all of the re-routed flows, e.g. due to a lack of bandwidth. In such a situation congestion management is desirable.

RMD defines functions for notifying edge nodes of a DiffServ domain about congestion occurring in interior routers. These notifications are based on "remarking" of data packets in the DS field in the interior routers in proportion to the overload. An edge note can then measure the number of marked packets and send a termination message for some flows, if it is necessary to reduce the traffic load.

An algorithm for reacting to congestion is e.g. described in Andras Csaszar, Attila Takacs, Robert Szabo, Vlora Rexhepi and Georgios Karagiannis "Severe Congestion Handling with Resource Management in DiffServ on Demand", in proceedings of Networking 2002—The Second International IFIP-TC6 Networking Conference, vol. 2345 of INCS, pages 443-454, 2002, Pisa, Italy, or in Lars Westberg, Andras Csaszar, Georgis Karagiannis, Adam Marquetant, David Partain, Octavian Pop, Vlora Rexhepi, Robert Szabo and Attila Takàcs "Resource Management in DiffServ (RMD): A Functionality and Performance Behaviour Overview" in proceedings of PfHSN 2002—$7^{th}$ International Workshop on Protocols for High-Speed Networks, vol. 2334 of INCS, pages 17-34, 2002, Berlin, Germany.

A problem encountered in such algorithms can be that of over-reaction to a congestion condition by terminating more flows than necessary to decrease congestion. This is also called under-shoot, in that the actual load falls below a desired level due to the over-reaction.

WO 2206/052174 describes ways of dealing with the problem of over-reaction. In the described system, the interior routers of a domain mark packets in proportion to the overload, and the signalled overload is stored. In other words, the interior routers or nodes have a form of "memory" for measured overload. This memorized information is then taken into account when marking new packets in the future. Furthermore, the interior routers mark the forwarded data units proportionally to the degree of overload, and the egress nodes count the marked data units, in order to measure the degree of overload.

OBJECT OF THE INVENTION

The object of the present invention is to provide an improved way of dealing with congestion in network domains comprising one or more ingress nodes, a plurality of interior routers and one or more egress nodes, especially in view of simplifying the interior routers. Preferably, it is desired to also achieve good congestion response handling without provoking under-shoot, i.e. without terminating flows beyond what is necessary.

SUMMARY OF THE INVENTION

The object is solved by the subject-matter of the independent claims. Advantageous embodiments are described in the dependent claims.

According to a basic embodiment of the present invention, an edge node is provided for a network domain that comprises an ingress node for receiving and routing data units belonging to a plurality of flows into the network domain, a plurality of interior routers for routing the data units through the network domain, and at least one egress node for routing data units out of the network domain. At least one of the interior routers is arranged to detect whether it is subject to a congestion condition and to congestion mark routed data units if it is subject to the congestion condition. Note that it is not necessary that every interior router have this functionality, but that it is preferable that each interior router can act in this way. The congestion marking of routed data units can e.g. be accomplished by setting a certain value in a predetermined field of the header of a routed data unit. The edge node of the invention is arranged to act as the egress node and comprises a control element for performing a congestion handling function that comprises a part for detecting the presence of congestion marked data units, and a part for reacting to the detection of the presence of congestion marked data units by invoking a congestion control process. The congestion control process comprises sending to the ingress node an instruction for terminating one or more flows to thereby reduce a traffic load, waiting a predetermined period of time and then determining whether congestion marked data units are still arriving at the edge node, and if congestion marked data units are still arriving, repeating the steps of sending and waiting.

By waiting a predetermined period of time before possibly sending a further instruction to reduce traffic load, the delay between sending such an instruction and the instruction actually being put into place and having an effect can be taken into account. In other words, the above described concept recognizes that there is a certain delay between the sending of a load reduction instruction by the egress node, and the point in time when the egress node is capable of measuring a reaction to that instruction. The delay comprises the time that it takes for the instruction to reach the ingress node, the time that the ingress node takes to follow the instruction, and the time that it takes for data units injected into the domain by the ingress node after following the instruction for again reaching the egress node. By not sending further reduction instructions within the delay period, an under-shoot due to excessively reacting to the reception of congestion marked data units can be avoided in a very simple way. Namely, it is not necessary to specifically adapt the interior routers of the domain, i.e. these can be kept simple.

In accordance with a preferred embodiment, one or more interior routers are arranged in such a way that they can detect whether a load exceeds a first load threshold or a second load threshold that is higher than the first load threshold, and to generate congestion marked data units comprising a first marker if the traffic load exceeds the first load threshold, and a second marker that is different from the first marker if the traffic load exceeds the second load threshold. The egress node in turn can then be arranged in such a way that its congestion control process comprises setting a load reduction parameter to a first load reduction value in response to detecting the first marker in received data units, and to a second load reduction value in response to detecting the second marker in received data units, where the second load reduction value corresponds to a larger load reduction than the first load reduction value.

The advantage of this concept is that an effective congestion control can be achieved with very simple means. Namely, the interior routers only need to be able to distinguish two different load thresholds for incoming traffic, and to accordingly mark the routed data units. It is not necessary that the data units be marked in proportion to the overload or congestion, as it is e.g. possible that the marking occurs in a stepwise way, i.e. once the respective threshold is exceeded, all subsequently routed data units are accordingly marked. In this way, the interior routers can be implemented in a simple way. Naturally, it is nonetheless possible to combine the concept with that a proportional marking, i.e. that the interior node marks only a fraction of the forwarded data units, proportional to the degree of overload or congestion, once a given threshold is exceeded.

In any case, by providing the two different load thresholds and arranging the egress node to accordingly instruct a larger or smaller load reduction, an effective congestion response can be provided, without the necessity of having to implement any complicated mechanisms in the interior routers or the egress nodes. For example, it is not necessary to perform proportional marking in the interior routers, nor is it then necessary to perform measurements of the degree of congestion on the basis of such proportionally marked data units in the egress node.

It is noted that the provision of two thresholds and two corresponding load reduction values is only an example, as this concept can naturally also be applied with a greater number of thresholds and accordingly associated load reduction values. For example, in addition to the two thresholds just mentioned, a third threshold could be provided indicating a higher load than the second threshold, and accordingly the egress node could be arranged to respond to third markers indicating the third threshold by sending a load reduction instruction corresponding to a third load reduction value that corresponds to a higher load reduction than the second load reduction value.

DETAILED DESCRIPTION OF EMBODIMENTS

In the following, specific embodiments of the present invention will be described with reference to the figures. The embodiments are only intended to be seen as examples of the general inventive concepts outlined in the claims, such that they have no limiting effect on the disclosure of these inventive concepts. They only serve to provide the skilled person with a better understanding.

Figure 1:
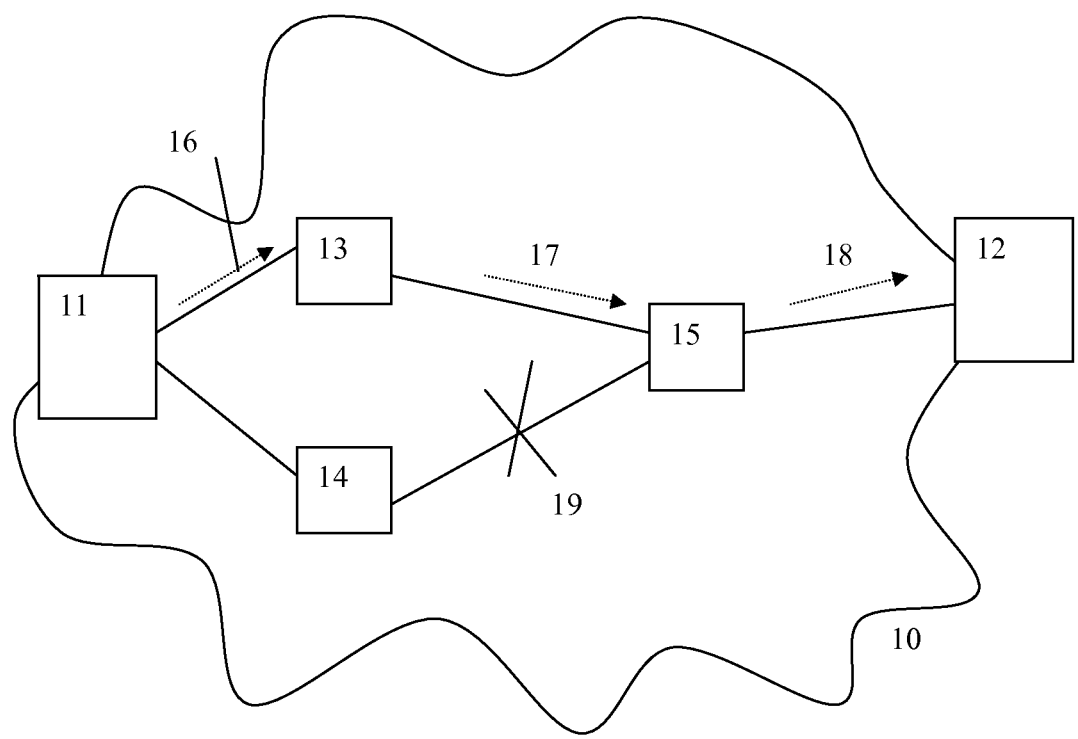
FIG. 1 is a schematic representation of a network domain comprising an ingress node, an egress node and a plurality of interior routers.

FIG. 1 schematically shows a network domain 10 that comprises an ingress node 11 for receiving and routing data units belonging to a plurality of flows into the network domain 10. It furthermore comprises a plurality of interior routers 13, 14, 15 for routing the data units through the network domain 10, and an ingress node 12 for routing the data units out of the network domain 10.

It is noted that in the present specification and claims, the term "network domain" is used generically to describe any arrangement of nodes having the just described structure, i.e. one or more ingress nodes, a plurality of interior routers, and one or more egress nodes. As such, a network domain can be a network of its own having routers, where the ingress and egress nodes are provided by appropriate gateway servers to other networks, or a network domain can equally be a sub-division of a larger network. Furthermore, in connection with different protocols and different technologies the sub-divisions of data sent over a network can have different names, such as packets, cells, segments, protocol data units, etc., and the term "data unit" as used in the present specification and claims is generic and relates to any such sub-division of a larger data amount.

In the example of FIG. 1, it is assumed that a link failure 19 has occurred between interior routers 14 and 15, such that all traffic from ingress node 11 to egress node 12 that used to pass through interior router 14 has to be re-routed via paths 16, 17 and 18 over interior routers 13 and 15. As a consequence of this re-routing, it could occur that an overload or congestion condition occurs in interior router 13.

In the embodiment of FIG. 1, it is assumed that one or more interior routers are arranged to detect whether they are subject to a congestion condition, and to accordingly congestion mark the data units routed through them, if a congestion condition is detected. The congestion condition can be defined in any suitable or desirable way, and equally the congestion marking can be done in any suitable or desirable way. For example, the congestion condition can be determined while measuring the data rate of incoming traffic before queuing, and comparing this value to a threshold value. The congestion condition can equally be defined by measuring the length of a buffering queue and comparing this value with a corresponding threshold value. In each case, if the threshold value is exceeded, then it is determined that a congestion condition is present. The marking of routed data units for indicating congestion can e.g. be done by setting appropriate information in the header of the routed data units. As an example, when using IP data units, the DiffServ Code Point (DSCP) or Explicit Congestion Notification (ECN) field in the IP header can be appropriately set to indicate congestion.

The procedure for congestion marking data units can be done in any suitable or desirable way, it can e.g. be done proportional to the overload or it can be cone in stepwise fashion. Proportional marking means that a degree of overload is measured, and only a fraction of the forwarded data unit is marked in accordance with that degree. A stepwise marking means that once the threshold is exceeded, all forwarded data units are marked. A third option can be that the interior node marks packets that are above a threshold.

Figure 2:
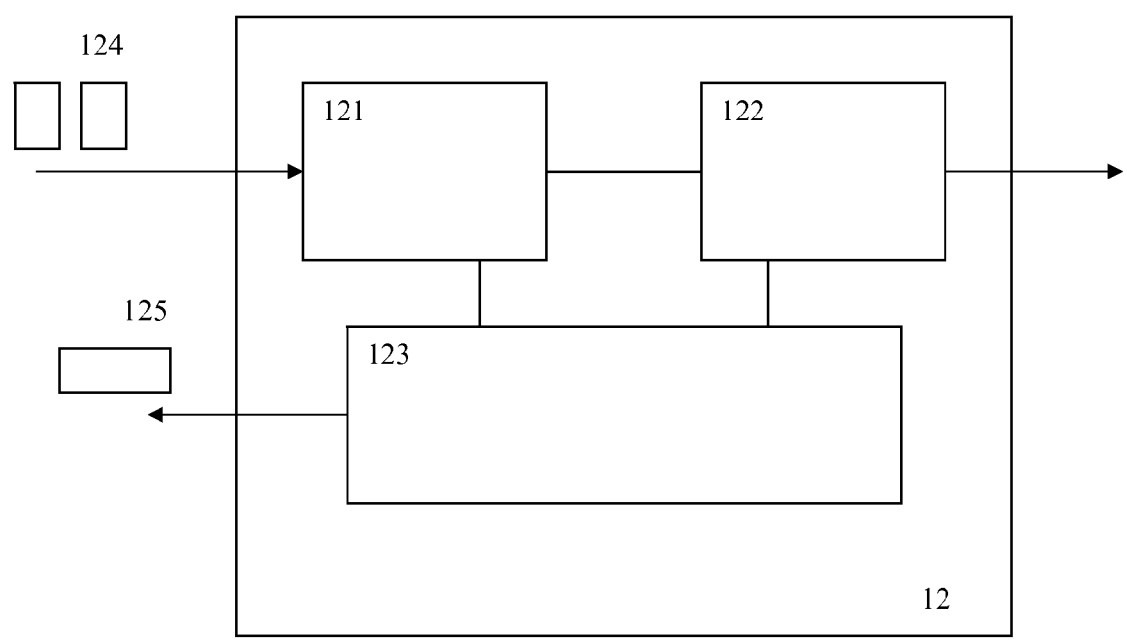
FIG. 2 is a block diagram schematically showing an edge node according to an embodiment of the invention.

FIG. 2 shows a block diagram of a schematic example of an edge node according to an embodiment of the present invention. Edge node 12, which is arranged to act as an egress node, is shown in FIG. 1. The edge node 12 comprises an input buffer 121 for receiving data units 124 from the network domain 10, and an output buffer 122 for holding data units to be forwarded out of network domain 10. The edge node 12 furthermore comprises a control element 123 that is arranged to perform a congestion handling function that comprises a part for detecting the presence of congestion marked data units arriving at the edge node 12, and a part for reacting to the detection of the presence of congestion marked data units by invoking an appropriate congestion control process. The congestion control process comprises sending to the ingress node 11 an instruction 125 for terminating one or more flows to thereby reduce a traffic load, waiting a predetermined period of time $T_{relax}$ and then determining whether congestion marked data units are still arriving at the edge node 12. If congestion marked data units are still arriving, then the steps of sending an instruction 125 and waiting the time $T_{relax}$ is repeated.

Figure 3:
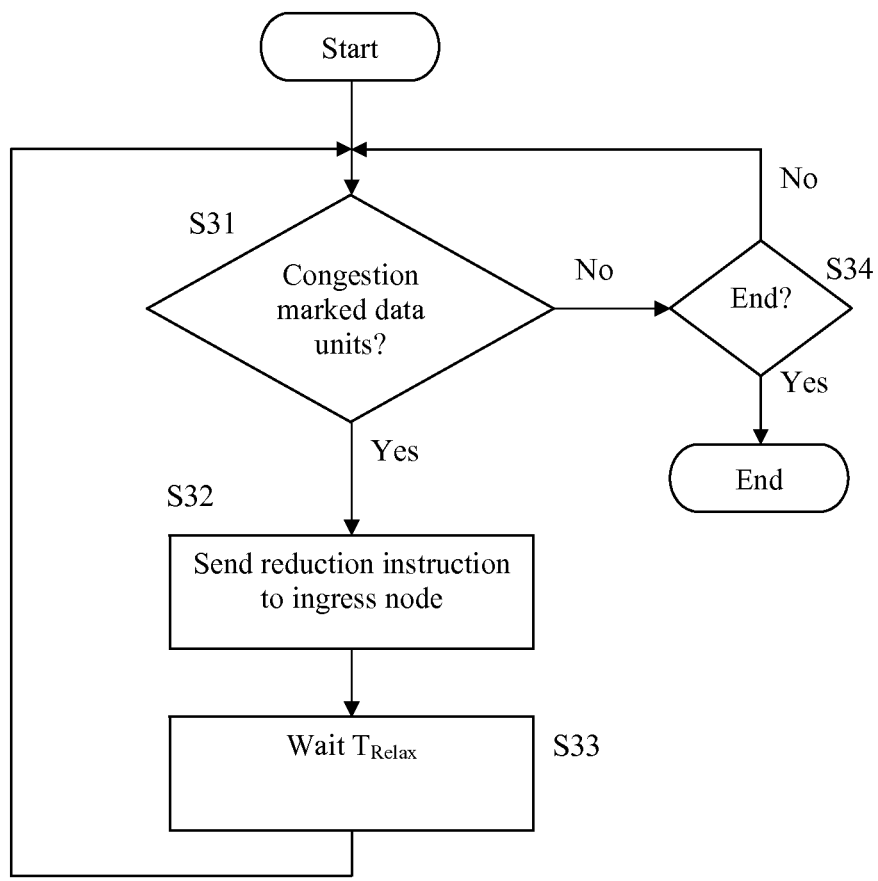
FIG. 3 is a flow chart showing a basic method embodiment of the present invention.

This procedure is shown in FIG. 3, where step S31 determines whether congestion marked data units are arriving, and if this is the case, then steps S32 and S33 are executed, in which a load reduction instruction is sent to the ingress node, and then a time $T_{relax}$ is waited. Afterwards, it is again determined in step S31 whether congestion marked data units are arriving, and if this is the case, then steps S32 and S33 are repeated. Otherwise, the procedure basically loops back to continue determining whether congestion marked data units are arriving, where step S34 indicates a possibility for ending the procedure, e.g. via an external interrupt.

It is noted that the control element 123 shown in FIG. 2 can be provided in any suitable or desirable way. For example, it can be a microprocessor of known kind for network nodes, which is programmed in such a way that it implements the novel concepts of the present invention. As such, the present invention can also be embodied as a computer program comprising program code parts arranged to perform the method of the invention when executed on a programmable network node. The invention can furthermore be embodied as a computer program product, such as a data carrier, comprising a computer program that is arranged to implement the method of the invention.

On the other hand, the control element 123 can also be composed of dedicated hardware elements for implementing the congestion handling function, or can comprise a suitable combination of hardware and software.

It is furthermore noted that the edge node 12 shown in FIG. 2 only indicates those features relevant for the explanation of the present invention, such that other known elements of network nodes are not shown for the purpose of simplicity.

The node reduction instruction sent by the egress node to the ingress node can be arranged in any suitable or desirable fashion. The instruction can for example be sent via dedicated signalling messages between the egress and ingress nodes, where such signalling messages can be sent over the same paths as data units, possibly using the same protocols, such as IP, or such messages can also be sent over dedicated signalling paths and/or using dedicated signalling protocols.

The instruction information itself can be chosen in a variety of ways, as is suitable or desirable. For example, it can be a simple binary signal that can assume one of two values, where one value indicates a reduction and the other indicates no reduction. When the ingress node receives the signal indicating reduction, it reduces the traffic by a predetermined value, e.g. the reduction corresponds to a preset data rate amount, and the ingress node then makes a selection among all flows being handled, in order to achieve the desired load reduction. The selection operation can be done in any suitable or desirable way, e.g. by random choice of flows until so many flows have been terminated that the desired reduction is achieved.

In the context of the present specification and claims, the term "flow" is understood generically as relating to data units that are identified by a certain source identifier and destination identifier, e.g. a source address and a destination address. The source and destination identifiers can also have further elements, such as port numbers. As a consequence, real-time or TCP data flows are an example of the generic flows referred to in the present application.

As indicated above, the instruction sent by the egress node to the ingress node can be simple binary information that can e.g. be coded by a single bit. However, it is preferable that the instruction comprises more information. According to a preferred embodiment the control element 123 is arranged such that the congestion control process furthermore comprises setting a value of a load reduction parameter in response to the detection of congestion marked data units, and the instruction is such that it instructs the ingress node to terminate one or more flows in accordance with the value of the load reduction parameter. In other words, the load reduction parameter differentiates more exactly how much load to reduce. This can be done in a variety of ways. For example, the load reduction parameter could be expressed in terms of a pre-arranged adjustment factor expressing different degrees of load reduction. For example, there could be a scale of reduction values, where a first value corresponds to a small predetermined adjustment A, a second value to a larger adjustment 2×A and a third value to a larger adjustment 3×A, where the instruction contains the respective first, second or third value, and the ingress node is arranged to accordingly reduce load by terminating an appropriate number of flows.

More preferably, the control element and congestion control process are arranged such that the load reduction parameter is expressed in terms of an absolute load or a relative load. In other words, the load can e.g. be measured in an absolute value, such as a data rate, and the instruction can accordingly contain a reduction information in terms of an absolute load, e.g. as an absolute data rate value. The load can also be expressed in relative terms, e.g. as a percentage of total load. As an example, a relative load can be indicated as a fraction of the load caused by a number of flows. The ingress node can then terminate flows from among that number, until the total load (e.g. the total data rate provided by the flows) has been reduced by the indicated fraction.

According to a preferred embodiment, the control element and congestion control process in the egress node are furthermore such that a flow detection routine is provided for detecting which flows are affected by congestion, and the instruction to the ingress node comprises an indication of flows from which one or more are to be terminated in accordance with the value of the load reduction parameter. In other words, when looking e.g. at the example of FIG. 3, it is preferable that there is a further step between S31 and S32, which comprises detecting the flows that are affected by congestion. This means that after having detected congestion marked data units, the control element and congestion control process in the egress node identifies which flows contain congestion marks, i.e. which flows carry a marking that indicates congestion. The flows are identified by their source and destination indications. For example, this detection routine can comprise examining the data units being received within a certain period of time, and noting all flow identifiers of data units that carry a congestion marking. The thus determined flow identifiers are then sent to the ingress node with the instruction, such that the ingress node can then terminate flows from the indicated group. The decision regarding which flows to terminate can be made in the ingress node or the egress node. If the decision is made in the ingress node, then it is not necessary to provide more information than the identifiers of the flows affected by congestion. However, according to a further embodiment, the egress node is arranged such that its control element and congestion control process also comprise a flow selection routine for selecting which flows to terminate, and where the instruction to the ingress node then comprises an indication of the selected flows. This embodiment is advantageous in that the ingress node control procedure can be kept simple, as the selection process is performed by the egress node.

As already specified earlier, the selection process regarding which flows to terminate can be done in any suitable or desirable way. For example, it can be a process of randomly selecting an affected flow, measuring the load of that flow (e.g. in terms of data rate), determining the load reduction when terminating the selected flow, and then judging whether the termination leads to the reduction as desired by the set value of the load reduction parameter. If the desired load reduction is not achieved, then the process of random selection and following determination is repeated, until so many flows have been considered for termination that the desired load reduction is achieved. The thus selected flows are then indicated to the ingress node for actual termination.

Naturally, other forms of flow selection are possible, e.g. it is possible that the individual load of flows is measured and the flows are classified according to their load, from highest load to lowest load. Then, the selection process starts by selecting flows with highest load and examining the effect of termination on load reduction, and selecting flows from highest load towards lowest load, until the desired load reduction is achieved. This selection procedure has the advantage that the selection procedure results in as few flows as possible being terminated in order to achieve the desired load reduction.

A further criterion for selecting flows to terminate can depend on the flow type. In other words, the selection process can furthermore take into account a flow type identifier (e.g. real-time flow, non-real-time flow) and then make the selection process dependent on the flow type. For example, the selection process can start by only terminating non-real-time flows. The flow type-based selection can also be combined with the above described random selection or selection based on load contribution.

It is noted that the flow identification information can also be used as a means of letting ingress nodes know which instructions are to be processed. This will be explained in more detail in the following. In a simple situation, a network domain only has one ingress node. In this case, each of one or more egress nodes sends its load reduction instruction to that ingress node. On the other hand, if a network domain comprises a plurality of ingress nodes, then there are different possibilities for ensuring a reliable communication between the egress nodes sending instructions and the ingress nodes receiving the instructions. One possibility is that the data units flowing through the network domain comprise an indication of the ingress node that injected the data unit into the network domain. In this case, an egress node receiving a congestion marked data unit can not only identify which flow that data unit belongs to, but also from which ingress node it came. Accordingly, load reduction instructions can be sent to the appropriate ingress node based on that information. As an alternative, in a system in which the data units do not carry indications identifying the ingress nodes, or if such information is not to be used, each egress node can send its instructions to all ingress nodes, together with at least an indication of the flows from which one or more are to be terminated, or with an indication of specific flows to be terminated. Each ingress node can then compare the identified flows with flows being handled by itself, in order to determine whether it is the correct recipient of the instruction. If it is, it terminates the appropriate flows, and if it is not, it simply ignores the instruction.

Regarding the setting of a value for the load reduction parameter, this can in principle be done in any suitable or desirable way. For example, if the interior routers of the network domain are arranged to proportionally mark data units when a congestion threshold is exceeded, in ways described previously, then the control element and congestion handling function of the egress node can be arranged to determine the degree of congestion or overload by counting the number of marked and unmarked data units of each affected flow, to thereby receive an indication of the degree of overload on the basis of the relationship between marked and unmarked data units. The value of the load reduction parameter can then be set accordingly, e.g. proportional to the measured degree of overload or congestion. As specified in the introduction to the present application, concepts for arranging interior routers of network domains in such a way that they mark data units proportionally to the degree of overload are known from the prior art, such that a further description is not necessary here.

According to a preferred embodiment of the present invention, in order to be able to simplify interior routers and also the control procedure in egress nodes arranged for detecting overload situations, the following new concepts are disclosed. One can arrange interior nodes as e.g. shown in the example of FIG. 7, with a control procedure to be explained with reference to FIG. 8.

Figure 7:
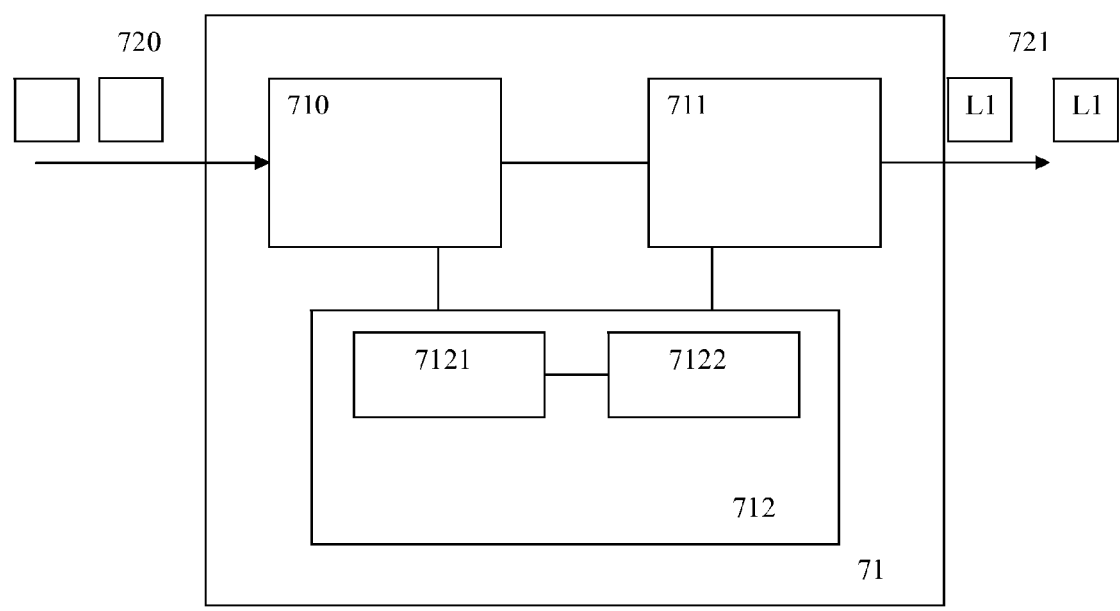
FIG. 7 is a block diagram schematically showing an embodiment of an interior router according to an embodiment of the present invention.

FIG. 7 shows an interior router that comprises an input buffer 710 for receiving data units 720 to be routed, an output buffer 711 for outputting data units 721 that are to be forwarded, and a control element 712 for controlling the operation of receiving and forwarding data units. As in the example of FIG. 2, further known elements of such routers are not shown for the purpose of simplicity.

The control element 712 comprises a part 7121 arranged to detect whether a load at the interior router exceeds a first load threshold th1 or a second load threshold th2, where the second load threshold th2 is larger than the first load threshold th1. The load can e.g. be measured in terms of data rate of arriving data units 720 before queuing. The thresholds may be accordingly expressed in absolute terms, i.e. as a load value, or in relative terms, e.g. as a fraction of a predetermined maximum load value. The interior router of FIG. 7 furthermore comprises a part 7122 in the control element 712 for generating congestion marked data units comprising a first marker L1 if the traffic load exceeds the first load threshold th1, and a second marker L2 different from the first marker, if the traffic load exceeds the second load threshold th2. In the example of FIG. 7, it is assumed that the first load threshold th1 but not the second load threshold th2 is exceeded, and therefore the outgoing data units 721 are marked with L1.

Figure 8:
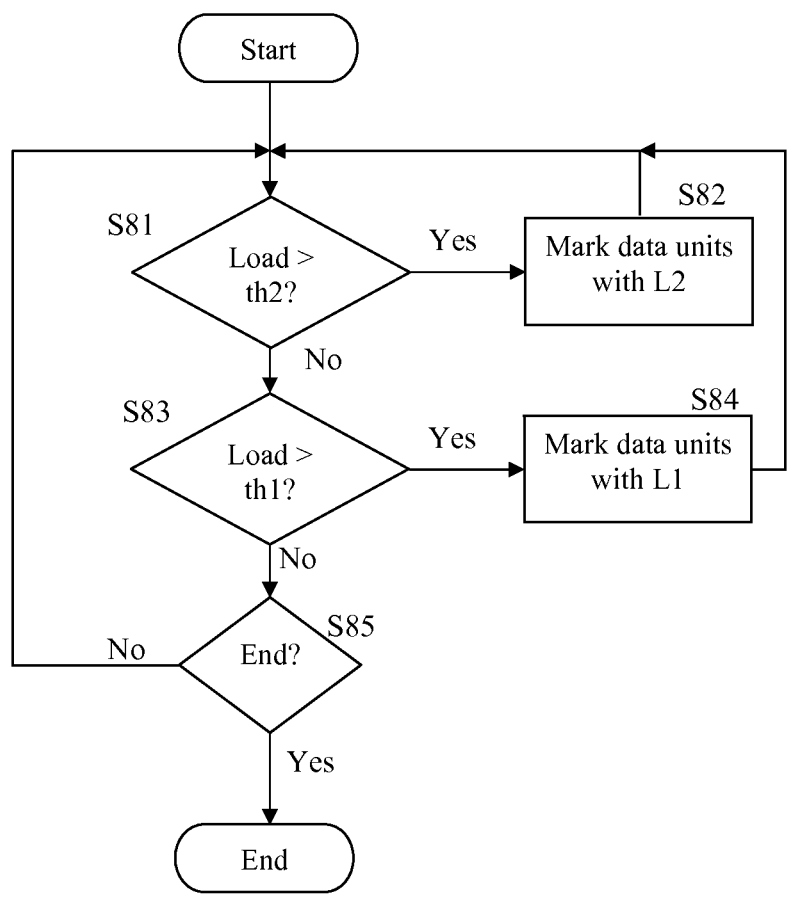
FIG. 8 is a flow chart of an embodiment of a method for controlling an interior router.

An example of a control process is shown in FIG. 8. In a first step S81 it is determined whether the load exceeds the second threshold th2. If yes, the outgoing data units are marked with L2, see step S82, and the process loops back to the beginning. If the load th2 is not exceeded, the procedure goes to step S83, where it is determined whether the threshold th1 is exceeded. If this is the case, then the outgoing data units are marked with L1, see step S84, and the procedure loops back to the beginning. If th1 is also not exceeded, then step S85 determines whether the procedure is to be ended, e.g. based on an external interrupt, and if the procedure is to continue, it loops back to the beginning.

It is noted that the control method of FIG. 8 is conveniently simple in that the marking of data units is done in a stepwise fashion, i.e. once a given threshold is exceeded, then all outgoing data units are accordingly marked. There is no proportional marking in this example. The control method of FIG. 8 is one example of how to control the interior router shown in FIG. 7. However, it is noted that the interior router of FIG. 7 can also be operated in a way that includes proportional marking, e.g. that element 7121 not only determines the exceeding of threshold of th1 or th2, but at the same time also measures the degree in which the threshold is exceeded, and that element 7122 marks a proportion of the outgoing data units in correspondence to the degree with which the respective threshold is exceeded.

In both cases, the edge node acting as an egress node is preferably arranged in the following way. The egress node can be arranged such that the congestion control process comprises setting the load reduction parameter to a first load reduction value $LR_1$ in response to detecting the first marker L1, and to a second load reduction value $LR_2$ in response to detecting the second marker L2. The second load reduction value $LR_2$ corresponds to a larger load reduction than the first load reduction value $LR_1$.

Figure 5:
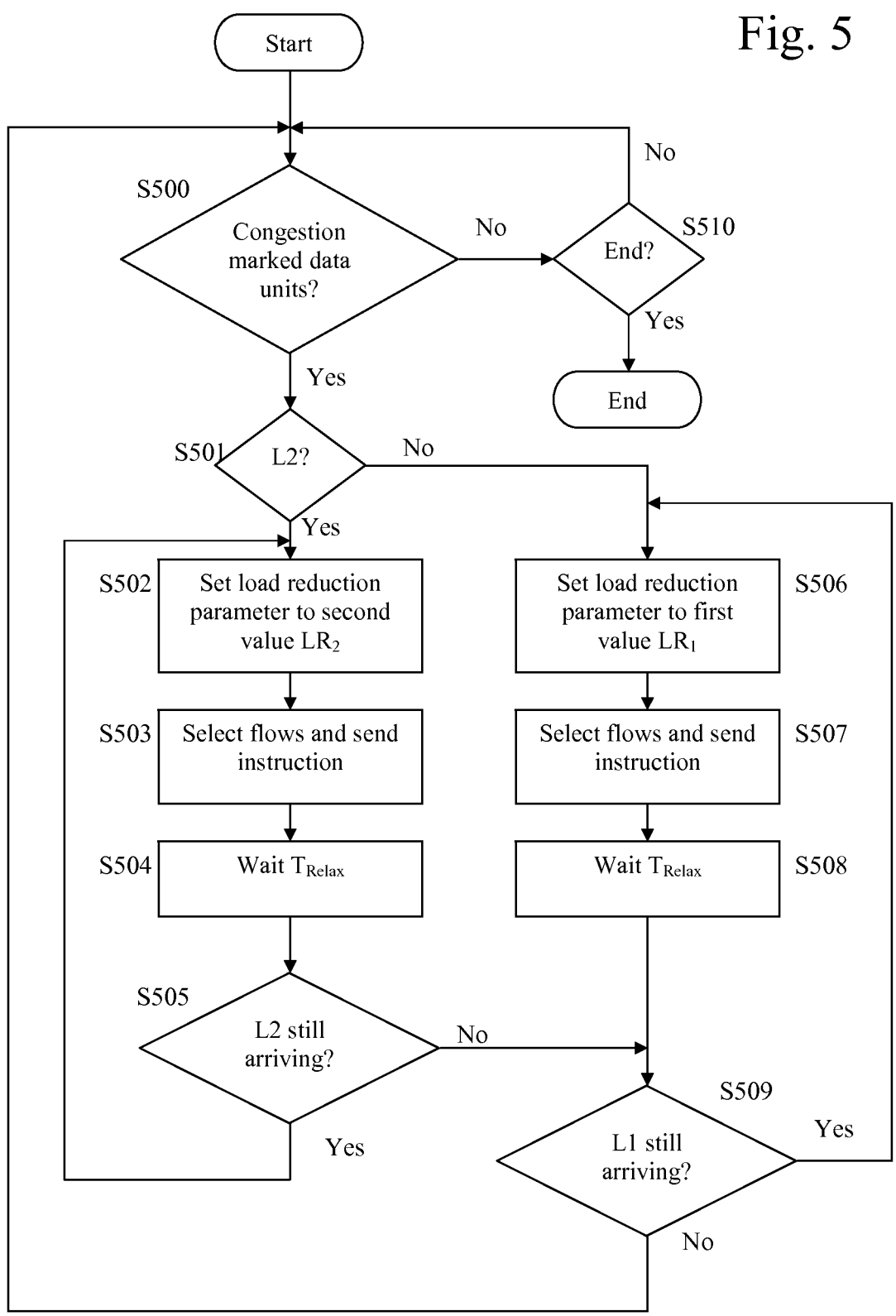
FIG. 5 is a flow chart of a further method embodiment of the present invention.

An example of this concept is shown in the method embodiment of FIG. 5. In a first step S500, it is determined whether congestion marked data units are present. If not, the system loops back to the beginning via step 510, in which it is determined whether the procedure should end, e.g. on the basis of an external interrupt. If congestion marked data units are present, step S501 determines whether the marking is an L1 marking. If yes, the procedure advances to step 506, in which the load reduction parameter is set to a first value $LR_1$. Then, in step S507, the procedure identifies the affected flows (i.e. which flows carry L1 markings) and selects which flows to terminate, in order to achieve a load reduction in accordance with $LR_1$. Furthermore, a corresponding instruction is then sent to the ingress node. After that, a period $T_{relax}$ is set in step S508, during which it is waited, i.e. no further reaction to receiving congestion marked data units is undertaken.

After the waiting period $T_{relax}$ has expired, step S509 determines whether congestion marked data units carrying L1 are still arriving. If yes, then the procedure loops back to step S506, in order to repeat the process of setting the load reduction parameter and sending an instruction for reducing the load to the ingress node. If no further data units carrying L1 are arriving, then the procedure loops back to step S500.

If in step S501 it is on the other hand determined that the congestion marked data units are carrying L2 markings, then the procedure advances to steps S502 to S504, which are basically identical to steps S506 to S508, except that in step S502 the load reduction parameter is set to the second value $LR_2$, which indicates a larger load reduction than $LR_1$. After step S504, step S505 determines whether data units carrying L2 markings are still arriving, and if this is the case, the system loops back to step S502, in order to repeat the steps of setting the load reduction parameter to $LR_2$ and then sending an appropriate instruction to the ingress node. On the other hand, if no further data units carrying L2 are arriving, the procedure goes to step S509 to determine whether possibly data units carrying L1 are arriving. The significance of this lies in the fact that $LR_2$ is associated with L2, which in turn is associated with threshold th2 that is larger than the threshold th1, which is in turn associated with L1 and $LR_1$. Namely, if the reduction by $LR_2$ given in step S503 leads to a load reduction at an overloaded interior router below th2, it is possible that the load still lies above th1, i.e. that data units marked with L1 are output, such that a procedure for further reducing the load in accordance with steps S506 to S508 should be followed.

The presently described embodiment has the following advantages. When the egress node receives congestion marked data units carrying the marker L2, it can be concluded that an overload exceeding th2 is occurring. If data units carrying L1 are arriving, it can be concluded that an overload exceeding th1 is occurring. Based on the knowledge that th2 corresponds to a larger load than th1, a correspondingly larger load reduction can be initiated (i.e. based on $LR_2$), without having to perform any measurements indicating the degree of overload. As a consequence, both interior routers and egress nodes can be simplified in comparison to the prior art.

In the following, examples for choosing the first and second load reduction value will be presented.

When using the concept of two-level data unit marking, the marking provides information on the degree of load at an interior router, without having to perform specific measurements. Namely, when data units are L1 marked, it is known that the load is between th1 and th2. Moreover, when L2 marking is detected, the load exceeds th2.

Th1 and th2 are preferably chosen in such a way that th1 is associated with a slight overload, whereas th2 is associated with a strong overload that requires a radical load decrease. For example, th1 can be set to lie 5% above an optimum load value, whereas th2 can be set to lie 10% above the optimum load value. Naturally, these are only examples, and other selections are possible.

As already indicated previously, th1 and th2 can be expressed in any suitable or desirable way. For example, they can be expressed as absolute load values, e.g. as a data rate, or as a relative value, e.g. as a fraction of an absolute upper limit load. It is noted that in accordance with the present invention it is preferable that all interior routers of the network domain in which the present application is applied use the same values of th1 and th2. Due to this, if the different interior routers of the network domain have different capacities, it is preferable to express th1 and th2 as relative values with respect to a given absolute maximum capacity.

As already mentioned, if the egress node receives L2 marked data units, then it can be concluded that the load in an interior router exceeds th2. When reducing the load, it is desired to sharply decrease the load, but preferably not below th1, as this would constitute an under-shoot. As a consequence, it is preferred to choose the second load reduction value that is set if L2 data units are received to a value that corresponds to a load reduction that is equal to the difference between the second load threshold th2 and the first load threshold th1. Namely, by reducing the load by this factor, it is ensured that the load will not fall below th1.

Another way of achieving the same effect is to choose the second load reduction value in such a way that it corresponds to a load reduction that is equal to the quotient of the difference between the second load threshold th2 and the first load threshold th1 divided by the second load threshold th2, i.e. equal to (th2−th1)/th2. Choosing the second load threshold in this way is preferable if the invention is applied in a network domain having a plurality of egress nodes. To give an example, one can assume that th1 and th2 are expressed as relative values of an absolute maximum load, e.g. as 50% and 60%, respectively. In this case, the second load reduction value can be set to (60−50)/60=⅙. As a consequence, the edge node that selects the flows in order to reduce the load in accordance with the load reduction value will determine the total load of all affected flows (e.g. the total data rate) and then reduce the number of flows such that the total load is reduced by ⅙.

When the egress node receives L1 marked data units, it can conclude that the load at an interior router lies between th1 and th2. As a consequence, the first load reduction value should correspond to a smaller load reduction than the second load reduction value, because using the above examples, a load reduction corresponding to th2−th1 would certainly reduce the load below th1, thereby causing under-shoot. The value of the first load reduction value can be chosen in any suitable or desirable way with respect to a second load reduction value, e.g. as a certain fraction like ½, ⅓, ¼, etc.

According to a further embodiment, the control element and congestion control process of the egress node are arranged in such a way that if the step of setting the load reduction parameter to the first load reduction value $LR_1$ is repeated more than once, i.e. that after the time $T_{relax}$ data units carrying L1 are still received, the value of $LR_1$ is consecutively reduced in each repetition. In other words, the congestion control process is such that it comprises a procedure for sending to the ingress node the termination instruction corresponding to a momentary first load reduction value $LR_1(i)$ and then waiting the predetermined period of time $T_{relax}$, subsequently determining whether congestion marked data units containing the first marker L1 are still arriving, and if the first marker is still detected, setting the load reduction parameter to a new momentary first load reduction value $LR_1(i+1)$ that is smaller than the previous momentary first load reduction value $LR_1(i)$, and then repeating the steps of sending the instruction and waiting $T_{relax}$.

Figure 6:
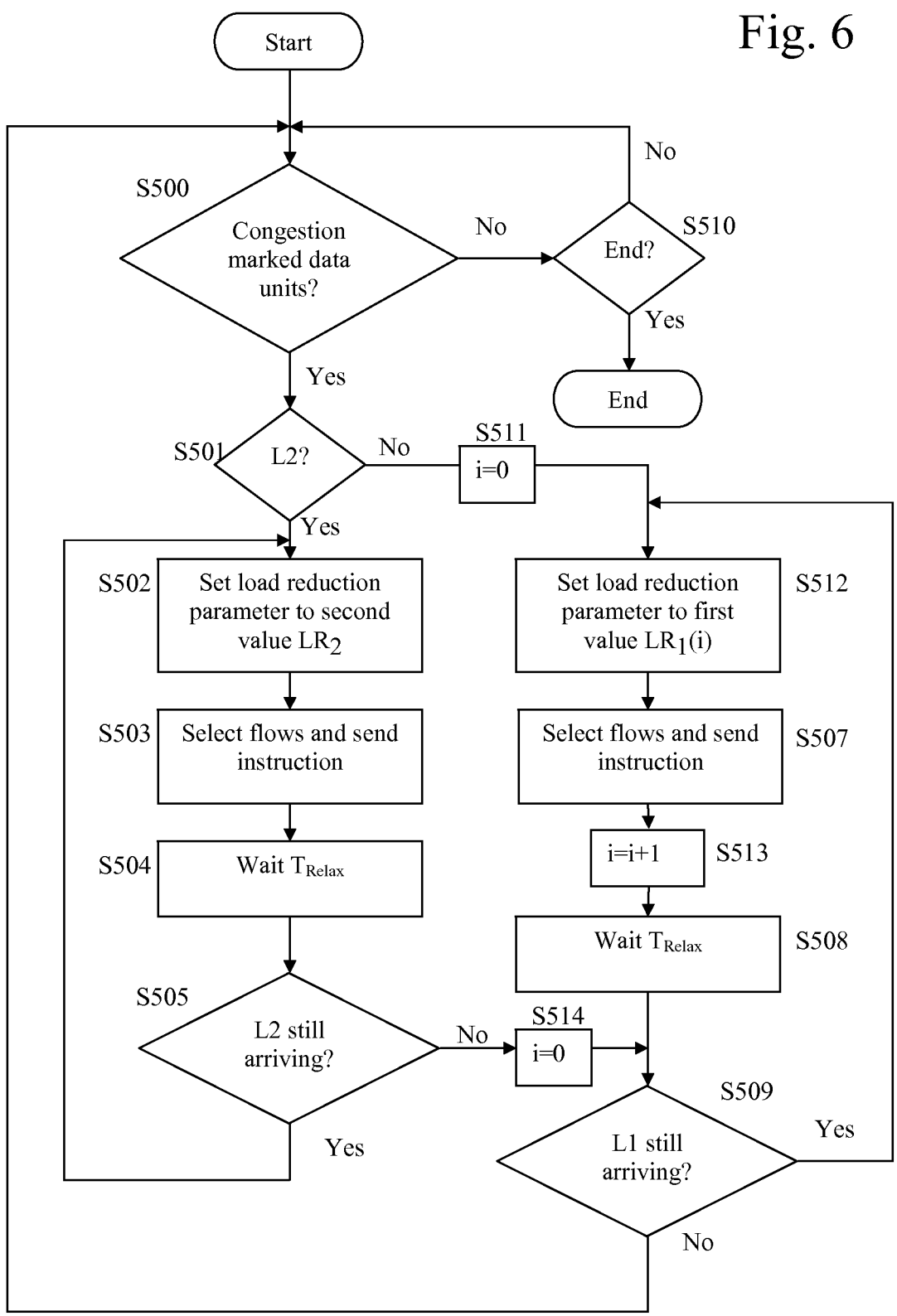
FIG. 6 is a flow chart of yet another method embodiment of the present invention.

This can e.g. be seen from the example of FIG. 6, which is a variation of the method shown in FIG. 5. Steps in FIG. 6 that are identical to corresponding steps in FIG. 5 carry the same reference numeral, such that a renewed description is not necessary. The difference between the example of FIG. 6 and FIG. 5 is that after determining in step S501 that the congestion marked data units carry L1 markers, a value i is set to zero at step S511. Subsequently, in step S512, which corresponds to step S506 of FIG. 5, the load reduction parameter is set to a first value $LR_1(i)=LR_1(0)$. Then, in step S507 the flows to be terminated are selected and a corresponding instruction is sent. Afterwards, in step S513 i is incremented by 1. Then, in step S508, the waiting period $T_{relax}$ is started. If after step S509 the method loops back to step S512, a new first load reduction parameter $LR_1(i)=LR_1(1)$ is set, where in general $LR_1(i+1)<LR_1(i)$. It is noted that in the method of FIG. 6, there is also a step S514 for resetting the value of i subsequent to step S505 determining that no L2 marked data units are being received.

The significance of choosing ever decreasing values of $LR_1$ is that if one knows that the load is between th1 and th2, then each step of reducing the load makes it more likely that one will fall below th1. As a consequence, in order to avoid under-shoot, it is preferable that the load reduction value $LR_1$ be reduced in each successive iteration.

The definition for reducing the subsequent values of $LR_1(i)$ can be chosen in any suitable or desirable way. For example, $LR_1(i)$ can be chosen as $LR_1(0)/(i+1)$. According to a preferred embodiment, the setting of the new momentary first load reduction value $LR_1(i+1)$ smaller than the previous momentary value $LR_1(i)$ is arranged such that the sum of the overall sequence $$\sum_{i=1...n} LR_1(i)$$

of consecutively set momentary first load reduction value should be smaller than or equal to the second load reduction value $LR_2$. For example, if $LR_2$ is chosen to correspond to th2−th1, then the sum over $LR_1(i)$ should preferably be smaller than or equal to th2−th1.

In the general concept of the invention and the above described embodiments, a waiting period $T_{relax}$ is provided, in order to take into account the delay between the sending of a load reduction instruction by the egress node and the egress node being able to actually determine an affect of having sent that instruction. The waiting period $T_{relax}$ can be chosen in any suitable or desirable way. For example, it can be set to a fixed value, i.e. when the edge node acting as an egress node is installed, then $T_{relax}$ is set to a fixed value, e.g. chosen on the basis of measured delay times between edge nodes in the network domain under consideration. As an example, if the average propagation delay between edge nodes in the network domain is T, then $T_{relax}$ can be set to a value somewhat larger than 2T, e.g. 2.5T.

According to a preferred embodiment, the predetermined period of time $T_{relax}$ is an adaptable value and the control element and the congestion response procedure of the egress node is arranged such that an adaptation routine for the time $T_{relax}$ is provided. This adaptation routine preferably comprises a routine for determining an indication of a data unit propagation time from the ingress node to the egress node, and adapting $T_{relax}$ on the basis of that indication of the data unit propagation time. The routine for determining an indication may comprise monitoring periodic refresh messages and/or dedicated query/response messages and/or keep-alive signalling messages exchanged between the ingress node and the egress node. This will be explained with respect to examples in the following.

As mentioned above, the time $T_{relax}$ serves to take into account the delay between sending an instruction and being able to notice an affect of that instruction. As a consequence, the value should preferably be adjusted on the basis of the propagation delay or roundtrip time (RTT) associated with exchanging messages between the egress node and the ingress node. It should be noted that the affect of terminating flows at the ingress node will propagate with the data units of the flows that are not terminated, and the time that it takes these date units to reach the egress node can actually be longer than the average propagation time, due to routing and queuing delays along the path through the network domain. As a consequence, the predetermined waiting period $T_{relax}$ may be set to be significantly longer than the propagation delay, e.g. 3×RTT to 5×RTT.

Different approaches may be used to determine the propagation delay or RTT, depending on the nature of the network domain and the protocols and routines that are employed. For example, if a protocol using soft-states is used (like RSVP or the NSIS signalling protocol), then refresh messages are used to maintain reservation states. These messages are typically sent periodically, and they provide a good opportunity to be used for RTT measurements. Similarly dedicated query/response messages can be used to derive a value for RTT. In NSIS, a query message is defined, which can be sent from an egress node to an ingress node. As a response, the ingress node sends a corresponding response message back to the egress node, where the egress node can measure the delay between sending the query and receiving the response, and use this measurement as an estimate of RTT.

Another possibility for assessing RTT can be the use of keep-alive signalling messages sent between edge nodes of a network domain. On the basis of such keep-alive signalling messages, each egress node can maintain a table of propagation delay or RTT values between itself and any other edge node.

Another approach to updating the value of $T_{relax}$ uses worst-case estimates of the RTT. Instead of measuring the RTT by signalling messages, one can also use routine data bases of intra-domain routing protocols (such as USPF, IS-IS) if such protocols are being used. With such a data base, the actual path between any pair of edge nodes can be derived, and by accessing the link queue length properties, the worst-case RTT can be calculated.

Figure 4:
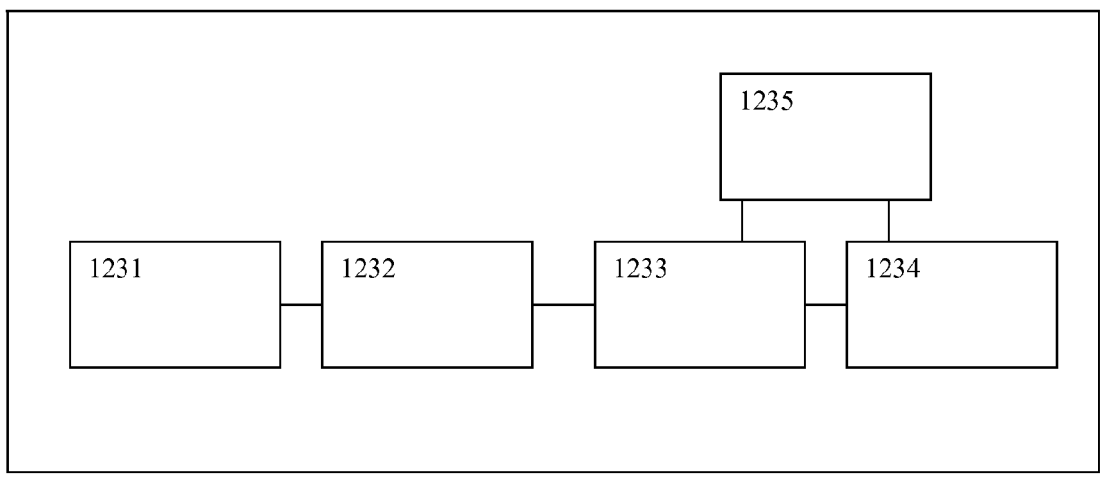
FIG. 4 is a block diagram schematically showing a further embodiment of an edge node of the present application.

FIG. 4 shows a preferred embodiment of a control element 123. Reference numeral 1231 refers to a part that determines whether congestion marked data units are being received, but only if $T_{relax}$ is not currently running, i.e. the system is not in a waiting period. Reference numeral 1232 refers to a part for calculating the amount of traffic to terminate, i.e. setting the value of the load reduction parameter if congestion marked data units are detected. Reference numeral 1233 refers to a part for identifying affected flows and selecting which flows to terminate, in order to provide the load reduction in accordance with the load reduction value. Part 1233 can e.g. be associated with an information base on candidate flows for termination, which flows may be grouped according to their ingress node. After the load reduction value has been set, part 1233 selects the necessary number of flows to realize the desired load decrease. Reference numeral 1235 relates to a part for estimating the delay between sending an instruction and being able to measure the affect of the instruction. For example, it can be an RTT estimator using one or more of the above described concepts. Part 1235 may e.g. maintain an information base of RTT estimates as a function of the ingress nodes. Reference numeral 1234 refers to a part for calculating or setting the waiting period $T_{relax}$, preferably on the basis of the estimation made by part 1235 and on the basis of the flows selected in part 1233. The time $T_{relax}$ be set to relax can e.g. the maximum RTT among the selected flows, i.e. it is determined which ingress node among the ingress nodes associated with the selected flows is the most distant, i.e. has the largest RTT, and this RTT is then set as $T_{relax}$. The set value of $T_{relax}$ can e.g. be counted down in a timer, where the operation of part 1231 is disabled as long as the timer is counting down. It is noted that the selection operation of part 1233 may also be made dependent on RTT estimates held in the information base of element 1235, in such a way that part 1233 selects flows to terminate that have the smallest stored RTT.

The elements 1231-1235 of control element 1233 shown in FIG. 4 can be provided as hardware elements, as software elements executed on a programmable processor or as combinations of hardware and software.

The above described concepts can be applied in any suitable context of network domains having ingress nodes, interior routers and egress nodes. It is specifically envisioned to apply the invention in the context of network domains making use of concepts described in the introduction, such as differentiated services (DiffServ) or more specifically Resource Management in DiffServ (RMD). The concepts can also be applied in connection with RSVP or the NSIS signalling protocol.

Although the present invention has been described with reference to specific embodiments, these are not intended to have any limiting effect, as they only serve to provide the skilled person with a better understanding, and the scope of protection of the invention is defined by the terms of the independent claims. Reference numerals serve to make the claims easier to read, but do not have any limiting effect.

What is claimed:

1. A system for managing congestion within a network domain the system comprising:
    an ingress node, the ingress node comprising a processor configured to receive and route data units entering the network domain;
    an interior node, the interior node comprising a processor configured to detect whether a traffic load at the interior node exceeds a first load threshold or a second load threshold higher than the first load threshold, and to generate congestion marked data units by:
        generating one or more congestion marked data units that comprise a first marker in response to detecting that the traffic load exceeds the first load threshold; and
        generating one or more congestion marked data units that comprise a second marker in response to detecting that the traffic load exceeds the second load threshold; and
    an egress node, the egress node comprising a processor configured to:
        detect the presence of congestion marked data units arriving at the egress node, the congestion marked data units including the first marker or a second marker, the first marker indicating that the traffic load at the interior node exceeds the first load threshold and the second marker indicating that a traffic load at the interior node exceeds a second load threshold corresponding to a higher load than the first load threshold; and
        react to the detection of the presence of congestion marked data units by invoking a congestion control process that comprises:
            waiting a predetermined period of time and then determining whether congestion marked data units that include the first marker are arriving at the egress node; and
            in response to the detection of congestion marked data units that include the first marker after waiting the predetermined period of time:
                setting a value of a load reduction parameter in response to the detection of congestion marked data units that include the first marker; and
                sending to the ingress node an instruction for terminating one or more flows to reduce the traffic load in accordance with the value of the load reduction parameter,
                wherein the load reduction parameter is set to a first load reduction value in response to detecting the first marker and to a second load reduction value in response to detecting the second marker, the second load reduction value corresponding to a larger load reduction than the first load reduction value.

2. The system of claim 1, wherein the egress node is configured such that the load reduction parameter is expressed in terms of one of an absolute load and a relative load.

3. The system of claim 1, wherein the egress node is further configured to perform a flow detection routine for detecting which flows are affected by congestion and from which one or more flows are to be terminated in accordance with the value of the load reduction parameter.

4. The system of claim 3, wherein the egress node is configured such that the congestion control process further comprises a flow selection routine for selecting which flows to terminate, and the terminating instruction comprises an indication of the selected flows.

5. The system of claim 1, wherein the egress node is configured such that the second load reduction value corresponds to a load reduction that is equal to a difference between the second load threshold and the first load threshold.

6. The system of claim 1, wherein the egress node is configured such that the second load reduction value corresponds to a load reduction that is equal to a quotient of a difference between the second load threshold and the first load threshold, divided by the second load threshold.

7. The system of claim 1, wherein the first load reduction value comprises a momentary first load reduction value, and wherein the congestion control process further comprises:
    after waiting the predetermined period of time, determining whether congestion marked data units containing the first marker are arriving at the egress node;
    if congestion marked data units containing the first marker are detected:
        sending to the ingress node an instruction for terminating one or more flows to reduce a traffic load corresponding to the momentary first load reduction value; and setting the load reduction parameter to a new momentary first load reduction value smaller than the momentary first load reduction value.

8. The system of claim 7, wherein the egress node is further configured to set the new momentary first load reduction value such that a sum of an overall sequence of consecutively set momentary first load reduction values is smaller than or equal to the second load reduction value.

9. The system of claim 1, wherein the egress node is configured such that the predetermined period of time is a fixed value.

10. The system of claim 1, wherein the egress node is further configured to adapt a value of the predetermined period of time according to an adaptation routine.

11. The system of claim 10, wherein the egress node is further configured to perform a routine for determining a data unit propagation time from the ingress node to the egress node, and the adaptation routine is arranged to adapt the predetermined period of time based on a data unit propagation time.

12. The system of claim 11, wherein the routine for determining a data unit propagation time comprises monitoring one or more of periodic refresh messages, dedicated query and response messages, and keep-alive signaling messages exchanged between the ingress node and the egress node.

13. A method for managing congestion in a network domain, the method comprising:
at an ingress node, receiving and routing data units entering the network domain;
at an egress node:
detecting a presence of congestion marked data units arriving at the egress node, the congestion marked data units including a first marker or a second marker, the first marker indicating that a traffic load at an interior node exceeds a first load threshold and the second marker indicating that a traffic load at the interior node exceeds a second load threshold corresponding to a higher load than the first load threshold;
reacting to the detection of the presence of congestion marked data units by invoking a congestion control process that comprises:
waiting a predetermined period of time and then determining whether congestion marked data units that include the first marker are still arriving at the egress node;
in response to the detection of congestion marked data units that include the first marker after waiting the predetermined period of time:
setting a value of a load reduction parameter in response to the detection of congestion marked data units that include the first marker; and
sending to the ingress node an instruction for terminating one or more flows to reduce the traffic load in accordance with the value of the load reduction parameter,
wherein the load reduction parameter is set to a first load reduction value in response to detecting the first marker and to a second load reduction value in response to detecting the second marker, the second load reduction value corresponding to a larger load reduction than the first load reduction value; and
at the interior node:
detecting whether the traffic load at the interior node exceeds the first load threshold or the second load threshold higher than the first load threshold; and
generating congestion marked data units by:
generating one or more congestion marked data units that comprise the first marker in response to detecting that the traffic load exceeds the first load threshold; and
generating one or more congestion marked data units that comprise the second marker in response to detecting that the traffic load exceeds the second load threshold.

14. The method of claim 13, wherein the load reduction parameter is expressed in terms of one of an absolute load and a relative load.

15. The method of claim 13, wherein the congestion control process further comprises a flow detection routine for detecting which flows are affected by congestion, and the terminating instruction comprises an indication of flows from which one or more are to be terminated in accordance with the value of the load reduction parameter.

16. The method of claim 15, wherein the congestion control process furthermore comprises a flow selection routine for selecting which flows to terminate, and wherein the terminating instruction comprises an indication of the selected flows.

17. The method of claim 13, wherein the second load reduction value corresponds to a load reduction that is equal to a difference between the second load threshold and the first load threshold.

18. The method of claim 13, wherein the second load reduction value corresponds to a load reduction that is equal to a quotient of a difference between the second load threshold and the first load threshold, divided by the second load threshold.

19. The method of claim 13, wherein the first load reduction value comprises a momentary first load reduction value, and wherein the congestion control process further comprises:
after waiting the predetermined period of time, determining whether congestion marked data units containing the first marker are arriving at the egress node; and
if congestion marked data units containing the first marker are detected:
sending to the ingress node an instruction for terminating one or more flows to reduce a traffic load corresponding to the momentary first load reduction value,
setting the load reduction parameter to a new momentary first load reduction value smaller than the momentary first load reduction value.

20. The method of claim 19, wherein setting the new momentary first load reduction value comprises setting the new momentary first load reduction value so that a sum of an overall sequence of consecutively set momentary first load reduction values is smaller than or equal to the second load reduction value.

21. The method of claim 13 wherein the predetermined period of time is a fixed value.

22. The method of claim 13, further comprising adapting the predetermined period of time according to an adaptation routine.

23. The method of claim 22, further comprising determining a data unit propagation time from the ingress node to the egress node, and wherein determining the predetermined period of time according to the adaptation routine comprises adapting the predetermined period of time based on the data unit propagation time.

24. The method of claim 23, wherein determining a data unit propagation time comprises monitoring one or more of periodic refresh messages, dedicated query and response messages, and keep-alive signaling messages exchanged between the ingress node and the egress node.

25. An apparatus for managing congestion within a network domain the apparatus comprising:
   an input buffer configured to receive data units from a network;
   an output buffer configured to store data units to be forwarded on the network; and
   a processor and memory containing instructions that, when executed by the processor, cause the apparatus to:
      detect the presence of received congestion marked data units, the congestion marked data units including a first marker or a second marker, the first marker indicating that a traffic load at a network node of the network exceeds a first load threshold and the second marker indicating that a traffic load at the network node exceeds a second load threshold corresponding to a higher load than the first load threshold;
      react to the detection of the presence of congestion marked data units by invoking a congestion control process that comprises:
         waiting a predetermined period of time and then determining whether congestion marked data units that include the first marker are arriving at the apparatus;
         in response to the detection of congestion marked data units that include the first marker after waiting the predetermined period of time:
            setting a value of a load reduction parameter in response to the detection of congestion marked data units that include the first marker; and
            sending to the network node an instruction for terminating one or more flows to reduce the traffic load in accordance with the value of the load reduction parameter,
            wherein the load reduction parameter is set to a first load reduction value in response to detecting the first marker and to a second load reduction value in response to detecting the second marker, the second load reduction value corresponding to a larger load reduction than the first load reduction value.

26. The apparatus of claim 25, wherein the processor is configured such that the load reduction parameter is expressed in terms of one of an absolute load and a relative load.

27. The apparatus of claim 25, wherein the processor is further configured to perform a flow detection routine for detecting which flows are affected by congestion and from which one or more flows are to be terminated in accordance with the value of the load reduction parameter.

28. The apparatus of claim 27, wherein the processor is configured such that the congestion control process further comprises a flow selection routine for selecting which flows to terminate, and the terminating instruction comprises an indication of the selected flows.

29. The apparatus of claim 25, wherein the processor is configured such that the second load reduction value corresponds to a load reduction that is equal to a difference between the second load threshold and the first load threshold.

30. The apparatus of claim 25, wherein the processor is configured such that the second load reduction value corresponds to a load reduction that is equal to a quotient of a difference between the second load threshold and the first load threshold, divided by the second load threshold.

31. The apparatus of claim 27, wherein the first load reduction value comprises a momentary first load reduction value, and wherein the congestion control process further comprises:
   after waiting the predetermined period of time, determining whether congestion marked data units containing the first marker are arriving at the egress node;
   if congestion marked data units containing the first marker are detected:
      sending to the network node an instruction for terminating one or more flows to reduce a traffic load corresponding to the momentary first load reduction value; and
      setting the load reduction parameter to a new momentary first load reduction value smaller than the momentary first load reduction value.

32. The apparatus of claim 31, wherein the processor is further configured to set the new momentary first load reduction value such that a sum of an overall sequence of consecutively set momentary first load reduction values is smaller than or equal to the second load reduction value.

33. The apparatus of claim 27, wherein the processor is configured such that the predetermined period of time is a fixed value.

34. The apparatus of claim 27, wherein the processor is further configured to adapt a value of the predetermined period of time according to an adaptation routine.

35. The apparatus of claim 34, wherein the processor is further configured to perform a routine for determining a data unit propagation time from the network node to the apparatus, and the adaptation routine is arranged to adapt the predetermined period of time based on a data unit propagation time.

36. The apparatus of claim 35, wherein the routine for determining a data unit propagation time comprises monitoring one or more of periodic refresh messages, dedicated query and response messages, and keep-alive signaling messages exchanged between the network ingress node and the apparatus.

37. A method for managing congestion in a network domain, the method comprising:
   detecting a presence of congestion marked data units arriving at a first node, the congestion marked data units including a first marker or a second marker, the first marker indicating that a traffic load at an interior node exceeds a first load threshold and the second marker indicating that a traffic load at a second node exceeds a second load threshold corresponding to a higher load than the first load threshold; and
   reacting to the detection of the presence of congestion marked data units by invoking a congestion control process that comprises:
      waiting a predetermined period of time and then determining whether congestion marked data units that include the first marker are still arriving at the first node; and
      in response to the detection of congestion marked data units that include the first marker after waiting the predetermined period of time:
         setting a value of a load reduction parameter in response to the detection of congestion marked data units that include the first marker; and
         sending to the second node an instruction for terminating one or more flows to reduce a traffic load in accordance with the value of the load reduction parameter,
         wherein the load reduction parameter is set to a first load reduction value in response to detecting the first marker and to a second load reduction value in response to detecting the second marker, the second load reduction value corresponding to a larger load reduction than the first load reduction value.

38. The method of claim 37, wherein the load reduction parameter is expressed in terms of one of an absolute load and a relative load.

39. The method of claim 37, wherein the congestion control process further comprises a flow detection routine for detecting which flows are affected by congestion, and the terminating instruction comprises an indication of flows from which one or more are to be terminated in accordance with the value of the load reduction parameter.

40. The method of claim 39, wherein the congestion control process furthermore comprises a flow selection routine for selecting which flows to terminate, and wherein the terminating instruction comprises an indication of the selected flows.

41. The method of claim 37, wherein the second load reduction value corresponds to a load reduction that is equal to a difference between the second load threshold and the first load threshold.

42. The method of claim 37, wherein the second load reduction value corresponds to a load reduction that is equal to a quotient of a difference between the second load threshold and the first load threshold, divided by the second load threshold.

43. The method of claim 37, wherein the first load reduction value comprises a momentary first load reduction value, and wherein the congestion control process further comprises:

after waiting the predetermined period of time, determining whether congestion marked data units containing the first marker are arriving at the first node; and if congestion marked data units containing the first marker are detected:

sending to the second node an instruction for terminating one or more flows to reduce a traffic load corresponding to the momentary first load reduction value; and setting the load reduction parameter to a new momentary first load reduction value smaller than the momentary first load reduction value.

44. The method of claim 43, wherein setting the new momentary first load reduction value comprises setting the new momentary first load reduction value so that a sum of an overall sequence of consecutively set momentary first load reduction values is smaller than or equal to the second load reduction value.

45. The method of claim 37, wherein the predetermined period of time is a fixed value.

46. The method of claim 37, further comprising adapting the predetermined period of time according to an adaptation routine.

47. The method of claim 46, further comprising determining a data unit propagation time from the second node to the first node, and wherein determining the predetermined period of time according to the adaptation routine comprises adapting the predetermined period of time based on the data unit propagation time.

48. The method of claim 47, wherein determining a data unit propagation time comprises monitoring one or more of periodic refresh messages, dedicated query and response messages, and keep-alive signaling messages exchanged between the second node and the first node.

* * * * *

UNITED STATES PATENT AND TRADEMARK OFFICE
CERTIFICATE OF CORRECTION

PATENT NO.         : 9,258,235 B2
APPLICATION NO.    : 13/964220
DATED              : February 9, 2016
INVENTOR(S)        : Báder et al.

It is certified that error appears in the above-identified patent and that said Letters Patent is hereby corrected as shown below:

In The Specification

In Column 1, Line 10, delete "2009," and insert -- 2009, now Pat. No. 8,509,085, --, therefor.

In Column 5, Line 54, delete "node 12" and insert -- node 11 --, therefor.

In Column 15, Line 16, delete "$T_{relax}$ be set to relax can e.g." and insert -- $T_{relax}$ can e.g. be set to --, therefor.

In The Claims

In Column 19, Line 9, in Claim 25, delete "processor and" and insert -- processor coupled to --, therefor.

In Column 20, Line 37, in Claim 36, delete "network ingress" and insert -- network --, therefor.

Signed and Sealed this
Fourteenth Day of June, 2016

Michelle K. Lee
*Director of the United States Patent and Trademark Office*